Jan. 20, 1959    H. L. VANDENBERG ET AL    2,870,357
DYNAMOELECTRIC MACHINE
Filed Nov. 30, 1955

Inventors
Howard L. Vandenberg
Peter M. Karsten
by Robert B. Benson
Attorney

United States Patent Office 2,870,357
Patented Jan. 20, 1959

2,870,357

DYNAMOELECTRIC MACHINE

Howard L. Vandenberg, Cincinnati, Ohio, and Peter M. Karsten, Boston, Mass., assignors to Allis-Chalmers Manufacturing Company, Milwaukee, Wis.

Application November 30, 1955, Serial No. 550,084

8 Claims. (Cl. 310—269)

This invention relates generally to a dynamoelectric machine. More specifically this invention relates to a structure for securing salient poles on a core to form a rotor of a dynamoelectric machine.

It is well known in the art to mount salient poles on the core of a dynamoelectric machine by using dovetail fittings between the poles and the core. Generally the salient poles are made up of laminations having dovetail projections formed at their inner end. Dovetail slots, corresponding to the dovetail projections on the poles, are milled into the core. The poles are mounted on the core by sliding the dovetail projections into the dovetail slots. The disadvantage of this arrangement is that it is expensive to mill a dovetail slot in the core. It requires a minimum of three cuts by the milling machine and the use of a special milling machine cutter to make a dovetail slot in the core.

The dynamoelectric machine of this invention overcomes the above mentioned objection in that the dovetail slot is punched in the laminated salient pole pieces and dovetail projections are formed in the core. A rectangularly shaped slot is cut into the core for each salient pole. The dovetail projections are formed between adjacent circumferentially spaced slots in the core. These rectangularly shaped slots can be milled in the core with one cut of the milling machine using a conventional cutter. Dovetail slots corresponding to the dovetail projections in the core are punched in the inner end of the salient pole laminations. The dovetail slot can be more economically made and more accurately reproduced by punchings in the salient pole laminations than by machining them in the core as was done in the prior art.

The current practice of mounting salient poles on the rotating element of a dynamoelectric machine requires wedges between the inclined surfaces of the dovetail slot and the dovetail projection.

In the dynamoelectric machine of this invention no wedges are necessary between the dovetail projection on the salient poles and the dovetail slot in the core if machining tolerances are such that a press fit is produced between the dovetail projection and the pole. Wedges may, however, be used between adjacent poles as a safety factor to assure a better clamping action of the pole on the dovetail projection.

Therefore it is the object of this invention to provide an improved rotor construction for a dynamoelectric machine.

Another object of this invention is to provide a rotor for a dynamoelectric machine in which the salient poles are securely mounted on the rotatable core.

Another object of this invention is to provide a rotor for a dynamoelectric machine which is easier and more economical to produce.

Another object of this invention is to provide a rotor for a dynamoelectric machine in which the salient poles can be securely mounted on the rotating element without the use of wedges.

Objects and advantages other than those set forth above will be apparent from the following description when read in conjunction with the accompanying drawings in which.

Figure 1:
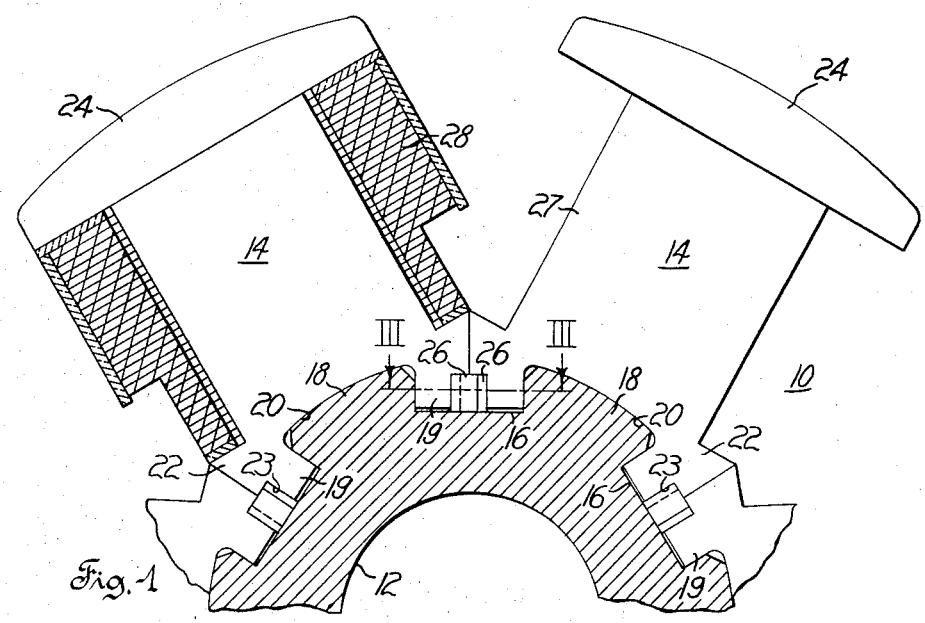
Fig. 1 is a cross sectional view of the rotor construction embodying this invention and having wedges between adjacent poles.

As shown in the drawings of the invention is illustrated in a rotor 10 for a synchronous generator. The rotor 10 comprises a core 12 and a plurality of salient poles 14 mounted thereon.

The core 12 may be of any suitable construction such as a shaft or a spider but as shown in Fig. 1 the core is a hollow shaft 12.

The shaft 12 has a plurality of circumferentially spaced longitudinally extending slots 16. The slots 16 have substantially parallel sides and are rectangular in shape. Therefore they may be cut into the shaft 12 by a conventional milling machine cutter and may be milled in a single cutting operation. The slots 16 define therebetween longitudinally extending dovetail projections 18.

Salient poles 14 are mounted on the dovetail projections 18 to form a salient pole rotor. As shown in Fig. 1, the inner end of the poles 14 have radially extending members 19 which define therebetween dovetail slots 20 complementary to the dovetail projections 18 for receiving the dovetail projections 18 when the poles 14 are mounted on the shaft 12. The salient poles 14 are preferably made up of a plurality of rotor core laminations. The dovetail slot 16 can be easily punched and accurately reproduced in the laminations.

In the embodiment shown in Fig. 1 the poles 14 have a longitudinally extending flange 22 on either side. The flange 22 of one pole cooperates with the flange 22 of the adjacent pole and with adjacent members 19 of adjacent poles 14 positioned within a common slot 16 to form a longitudinally extending keyway 23.

The adjacent flanges 22 are in abutting relation to form a flux path between the adjacent salient poles 14. Such a flux path is necessary when the salient poles are mounted on a sleeve or shaft which is nonmagnetic.

Oppositely tapered keys 26 are positioned within the keyway 23 to wedge the members 19 against the projections 18. The tapered keys 26 serve as a safety factor to securely mount the poles 14 on the projections 18. If machining tolerances are maintained to insure a press fit between the projection 18 and the members 19 which form the dovetail slot 20, the tapered keys would not be necessary to securely mount the poles 14 on the projections 18.

Pole tips 24 at the radially outer end of the pole 14 extend outwardly from the stem 27 of the pole 14. The pole tips 24 cooperate with the top of the flanges 22 to form a setting for the windings 28 only one of which is shown in Fig. 1.

When building the rotor 10 the circumferentially spaced slots 16 on the shaft 12 are cut by a single run of a milling machine using a conventional cutter. The difficult configuration, comprising the flanges 22 and the radially extending members 19 which form therebetween the dovetail slot 20 is punched in the inner end of the laminations. The salient poles 14 are formed by a plurality of laminations which are secured together by any suitable means. The salient poles 14 are mounted on the shaft 12 by sliding the pole 14 on the projection 18 so that the dovetail projection 18 fits into the dovetail slot 20. The keyway 23 is formed substantially within the slot 16 by the adjacent members 19 and adjacent flanges 22 of adjacent salient poles 14. The oppositely tapered keys 26 are positioned in the keyway 23, one from either end.

Figure 2:
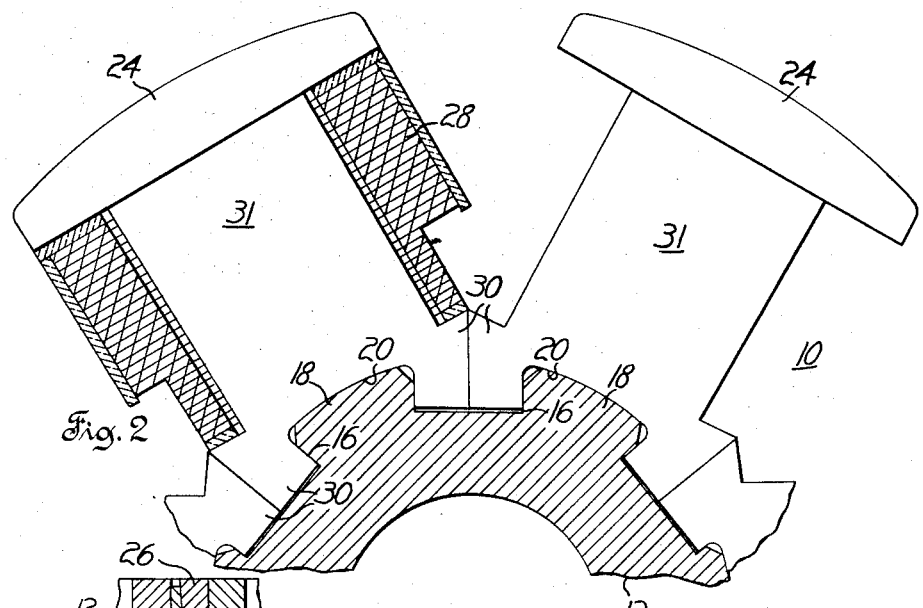
Fig. 2 is a cross sectional view of a modified rotor construction having no wedges.
Figure 3:
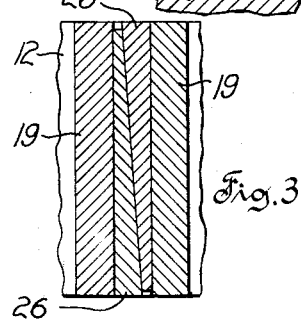
Fig. 3 is a cross sectional view taken along the line III—III of Fig. 1.

A second embodiment is illustrated in Fig. 2 which is similar to the embodiment shown in Fig. 1 except that the flange 22 and the member 19 as shown in Fig. 1 are merged to form the member 30 of Fig. 2. Parts in the second embodiment which are the same as parts in the first embodiment are identified by the same reference numerals.

Adjacent members 30 of adjacent poles 31 are positioned within a common slot 16 in abutting relation to each other and hence there is no keyway formed in the slots 16. The members 30 tend to force each other against the projections 18 to securely mount the salient poles 31 on the shaft 12. Therefore wedge means between the members are not necessary in this embodiment but, as in the first embodiment, they may be positioned in the slots 16 as a safety factor to assure better clamping action of the pole on the core. It is obvious, however, that a close fit would be necessary between the dovetail projection 18, the dovetail slot 20 and adjacent members 30 positioned within a common slot 16 to firmly mount the salient poles 31 on the shaft 12. Windings 28, only one of which is shown in Fig. 2, are mounted on the salient poles 31 between the top of the members 30 and the pole tips 24.

Although but two embodiments have been illustrated and described, it will be apparent to those skilled in the art that various changes and modifications may be made therein without departing from the spirit of the invention or from the scope of the appended claims.

It is claimed and desired to secure by Letters Patent:

1. In a dynamoelectric machine, a rotatable core having a plurality of circumferentially spaced longitudinally extending dovetail projections, adjacent projections defining therebetween slots having substantially parallel sides, poles mounted on said projections, the inner portion of said poles having radially extending members spaced apart to define therebetween a dovetail slot for receiving said dovetail projection to mount said poles on said core.

2. In a dynamoelectric machine, a rotatable core having a plurality of circumferentially spaced longitudinally extending slots, each of said slots having substantially parallel sides and adjacent said slots defining therebetween dovetail projections, poles mounted on said projections, the inner portion of each of said poles having radially extending members spaced apart to define therebetween a dovetail slot for receiving one of said dovetail projections to mount said poles on said rotatable core.

3. In a dynamoelectric machine, a rotatable core having a plurality of circumferentially spaced longitudinally extending dovetail projections, adjacent said projections defining therebetween slots having substantially parallel sides, poles mounted on said projections, the inner portion of said poles having radially extending members spaced apart to define therebetween a dovetail slot for receiving said dovetail projection, adjacent said members of adjacent said poles are positionable within a common said slot in abutting relation to each other to form flux path between adjacent poles and to wedge said members against said projection to securely mount said poles on said core.

4. In a dynamoelectric machine, a rotor, said rotor comprising a rotatable core having a plurality of circumferentially spaced longitudinally extending dovetail projections each pair of projections defining therebetween slots having substantially parallel sides, poles mounted on said projections, the inner portion of said poles having radially extending members spaced apart to define therebetween a dovetail slot for receiving said dovetail projection, adjacent said members of adjacent said poles are positionable within a common slot in abutting relation to each other and wedge means positioned within said slot to wedge said members against said projection to securely mount said poles on said element.

5. In a dynamoelectric machine, a rotor, said rotor comprising a rotatable core having a plurality of circumferentially spaced longitudinally extending slots, said slots having substantially parallel sides and defining therebetween dovetail projections, laminated poles mounted on said projections, the inner portion of said poles having radially extending members spaced apart to define therebetween a dovetail slot for receiving said dovetail projection, adjacent said members of adjacent said poles are positionable within a common slot and wedge means positioned within said slot and between said members to wedge said members against said projection to securely mount said poles on said element.

6. In a dynamoelectric machine, a rotor comprising a rotatable core having a plurality of circumferentially spaced longitudinally extending dovetail projections, adjacent said projections defining therebetween slots having substantially parallel sides, laminated poles mounted on said projections, the inner portion of said poles having radially extending members spaced apart to define therebetween a dovetailed slot for receiving said dovetail projection, said poles having longitudinally extending flanges on either side, adjacent said members positioned within a common said slot combining with adjacent said flanges to form a longitudinally extending keyway substantially within said common slot, and tapered keys positioned within said slot to wedge said members against said projections and securely mount said poles on said element.

7. In a dynamoelectric machine, a rotor, comprising a rotatable hollow shaft having a plurality of circumferentially spaced longitudinally extending dovetail projections, adjacent said projections defining therebetween slots having substantially parallel sides, laminated poles mounted on said projections, said poles having longitudinally extending flanges on either side, adjacent said flanges being in abutting relation to form a flux path between adjacent said poles, the inner portion of said poles having radially extending members spaced apart to define therebetween a dovetailed slot for receiving said dovetail projection, said slot combining with adjacent said flanges to form a longitudinally extending keyway substantially within said common slot, tapered keys positioned within said slot to wedge said members against said projections and securely mount said poles on said core.

8. In a dynamoelectric machine, a rotatable core having a plurality of circumferentially spaced longitudinally extending slots, said slots having substantially parallel sides, each side lying within a single plane and adjacent slots defining therebetween dovetail projections, poles mounted on said projections, the inner portion of said poles having radially extending members spaced apart to define therebetween a dovetail slot for receiving said dovetail projection to mount said poles on said rotatable core.

References Cited in the file of this patent

UNITED STATES PATENTS

| | | |
|---|---|---|
| 505,926 | Schmid | Oct. 3, 1893 |
| 533,246 | Steinmetz | Jan. 29, 1895 |
| 1,353,658 | Kostko | Sept. 21, 1920 |
| 2,308,028 | Rose et al. | Jan. 12, 1943 |

FOREIGN PATENTS

| | | |
|---|---|---|
| 17,268 | Great Britain | July 28, 1913 |